(12) United States Patent
Terai et al.

(10) Patent No.: US 12,023,982 B2
(45) Date of Patent: Jul. 2, 2024

(54) PROXIMITY AIR-CONDITIONING UNIT FOR VEHICLES

(71) Applicant: TOYODA GOSEI CO., LTD., Kiyosu (JP)

(72) Inventors: Nobuhiro Terai, Kiyosu (JP); Chiharu Totani, Kiyosu (JP); Yoshinori Masatsugu, Kiyosu (JP); Naoyuki Fukui, Kiyosu (JP); Hiroto Watanabe, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 399 days.

(21) Appl. No.: 17/439,916

(22) PCT Filed: Nov. 6, 2019

(86) PCT No.: PCT/JP2019/043349
§ 371 (c)(1),
(2) Date: Sep. 16, 2021

(87) PCT Pub. No.: WO2020/194839
PCT Pub. Date: Oct. 1, 2020

(65) Prior Publication Data
US 2022/0185059 A1    Jun. 16, 2022

(30) Foreign Application Priority Data
Mar. 27, 2019  (JP) .................................. 2019-061365

(51) Int. Cl.
*B60H 1/00*   (2006.01)
*B60H 1/34*   (2006.01)

(52) U.S. Cl.
CPC ..... *B60H 1/00285* (2013.01); *B60H 1/00028* (2013.01); *B60H 2001/0015* (2013.01); *B60H 2001/003* (2013.01); *B60H 2001/3471* (2013.01)

(58) Field of Classification Search
CPC .. B60H 1/00285; B60H 1/00028; B60H 1/34; B60N 2/5657; B60N 2/5628
See application file for complete search history.

(56) References Cited

U.S. PATENT DOCUMENTS 8,539,787 B2 *  9/2013  Ebigt ....................... B60N 2/24
                                                  62/244
11,511,651 B2 * 11/2022  Kawano ............. B60H 1/00285
(Continued)

FOREIGN PATENT DOCUMENTS

DE    102012006322 A1 * 11/2012 ............. B60N 2/449
DE    102011106967 A1 *  1/2013 ........... B60N 2/5635
(Continued)

OTHER PUBLICATIONS

International Search Report dated Dec. 24, 2019, issued in corresponding International Patent Application No. PCT/JP2019/043349.

*Primary Examiner* — Travis Ruby
*Assistant Examiner* — For K Ling
(74) *Attorney, Agent, or Firm* — Posz Law Group, PLC

(57) ABSTRACT

A proximity air conditioner is capable of performing energy-saving and efficient air-conditioning. A proximity air-conditioning unit for vehicles includes: a housing; a temperature adjustment unit including a temperature adjuster and a blower; and ducts, wherein upper ends of blowout ports of ducts are located above seat surfaces of seats, end portions in a long-side direction of the blowout ports are located on a front side with respect to other end portions thereof in a front-back direction of the seats, and the temperature adjust- (Continued)

ment unit is disposed between both end portions in the long-side direction of each of the blowout ports.

4 Claims, 4 Drawing Sheets

(56) References Cited

U.S. PATENT DOCUMENTS

| | | | | |
|---|---|---|---|---|
| 2008/0012398 A1* | 1/2008 | Alacqua | ............... | B60N 2/5657 |
| | | | | 297/180.1 |
| 2016/0031348 A1* | 2/2016 | Kurosawa | ............ | B60N 2/5635 |
| | | | | 297/180.1 |
| 2016/0250905 A1* | 9/2016 | Tanaka | ................. | B60N 2/5657 |
| | | | | 454/75 |
| 2018/0201165 A1* | 7/2018 | Rekow | ................... | B60N 2/773 |
| 2018/0361891 A1* | 12/2018 | Kato | ........................ | B60N 2/79 |
| 2020/0086774 A1 | 3/2020 | Muto et al. | | |

FOREIGN PATENT DOCUMENTS

| | | | | |
|---|---|---|---|---|
| DE | 102015213299 A1 * | 3/2016 | ............... | B60H 1/00 |
| JP | S62-189539 U | 12/1987 | | |
| JP | 2004-122802 A | 4/2004 | | |
| JP | 2006131106 A * | 5/2006 | ......... | B60H 1/00285 |
| JP | 2015-083397 A | 4/2015 | | |
| JP | 2017-178278 A | 10/2017 | | |
| JP | 2019-006373 A | 1/2019 | | |
| KR | 20050063885 A * | 6/2005 | ......... | B60H 1/00035 |
| KR | 2016014336 A * | 2/2016 | ............... | A61L 9/20 |

* cited by examiner

PROXIMITY AIR-CONDITIONING UNIT FOR VEHICLES

CROSS REFERENCE TO RELATED APPLICATION

This application is a U.S. National Stage Application of International Application No. PCT/JP2019/043349, filed on Nov. 6, 2019, and is based on Japanese Patent Application No. 2019-061365 filed on Mar. 27, 2019, the contents of which are incorporated herein by reference.

TECHNICAL FIELD

The present invention relates to a proximity air-conditioning unit for performing heating and cooling in a vehicle.

BACKGROUND ART

A general vehicle is equipped with an air conditioner for performing heating and cooling. In an engine vehicle which uses petroleum fuel such as gasoline as a power source and an engine as a prime mover, using exhaust heat during combustion of petroleum fuel as a heat source for heating in an air conditioner is common.

Electric vehicles, which have remarkably emerged in recent years, use automobile batteries such as lithium-ion secondary batteries as a power source. Since electric vehicles do not burn petroleum fuel, electric vehicles are advantageous in terms of reduction of $CO_2$ emissions, etc., as compared to the above-described engine vehicles.

However, on the other hand, electric vehicles cannot utilize exhaust heat during combustion of petroleum fuel.

Therefore, in an air conditioner mounted on an electric vehicle, using an automobile battery, which is a power source of an electric motor, as a power source of an electric heater is common. However, when the same automobile battery is used as the power sources for the electric motor for running and the electric heater for heating, for example, if the amount of energy required for heating is large such as in a severe cold season, there is a problem that the travelable distance of the vehicle is shortened by consuming a large amount of energy for the air conditioner. In this respect, electric vehicles are considered to be disadvantageous as compared to engine vehicles. The same applies to hybrid vehicles which use both an engine and an electric motor.

In recent years, a technology has been proposed in which, instead of performing air-conditioning of the entire vehicle compartment, air-conditioning is performed only on a target portion of the vehicle compartment.

Patent Literature 1 introduces a technology for selectively blowing air to the palms, etc., of occupants by an air conditioner for vehicles. Patent Literature 1 indicates that the air conditioner is able to easily blow air to a local part such as a hand of an occupant without the occupant taking an unnatural sitting posture.

When air-conditioning is performed only on a portion close to an occupant in the vehicle compartment as described above, there is a possibility that the amount of energy used is reduced as compared to the case of performing air-conditioning of the entire vehicle compartment.

Hereinafter, in the present description, the technology for performing air-conditioning only on a portion close to an occupant in a vehicle compartment as described above is sometimes referred to as proximity air-conditioning.

Meanwhile, the proximity air-conditioning is considered to be useful for energy saving of air conditioners and vehicles as described above. However, in reality, when air is merely blown to the occupants by the air conditioner as introduced in Patent Literature 1, performing heating to such an extent that the occupants perceive as comfortable, and reducing the amount of energy used, are difficult. Therefore, development of a proximity air conditioner for vehicles which is capable of efficiently performing air conditioning to realize energy saving is desired.

CITATION LIST

Patent Literature

Patent Literature 1: JP2004-122802 (A)

SUMMARY OF INVENTION

Technical Problem

The present invention has been made in view of the above circumstances, and an object of the present invention is to provide a proximity air conditioner for vehicles which is capable of efficiently performing air-conditioning to realize energy saving.

Solution to Problem

A proximity air-conditioning unit for vehicles according to the present invention solving the above problem is a proximity air-conditioning unit for vehicles, including:
  a housing disposed on a lateral side of a seat of a vehicle;
  a temperature adjustment unit including a temperature adjuster and a blower and disposed inside the housing; and
  a duct disposed inside the housing and having an introduction port into which air having passed through the temperature adjustment unit is introduced, a blowout port exposed on a surface of the housing and facing the seat, and a flow path portion providing communication between the introduction port and the blowout port, wherein
  an upper end of the blowout port is located above a seat surface of the seat,
  one end portion in a long-side direction of the blowout port is located on a front side with respect to another end portion thereof in a front-back direction of the seat, and
  the temperature adjustment unit is disposed between both end portions in the long-side direction of the blowout port.

Advantageous Effects of Invention

The proximity air-conditioning unit for vehicles according to the present invention performs energy-saving and efficient air-conditioning.

DESCRIPTION OF EMBODIMENTS

Figure 1:
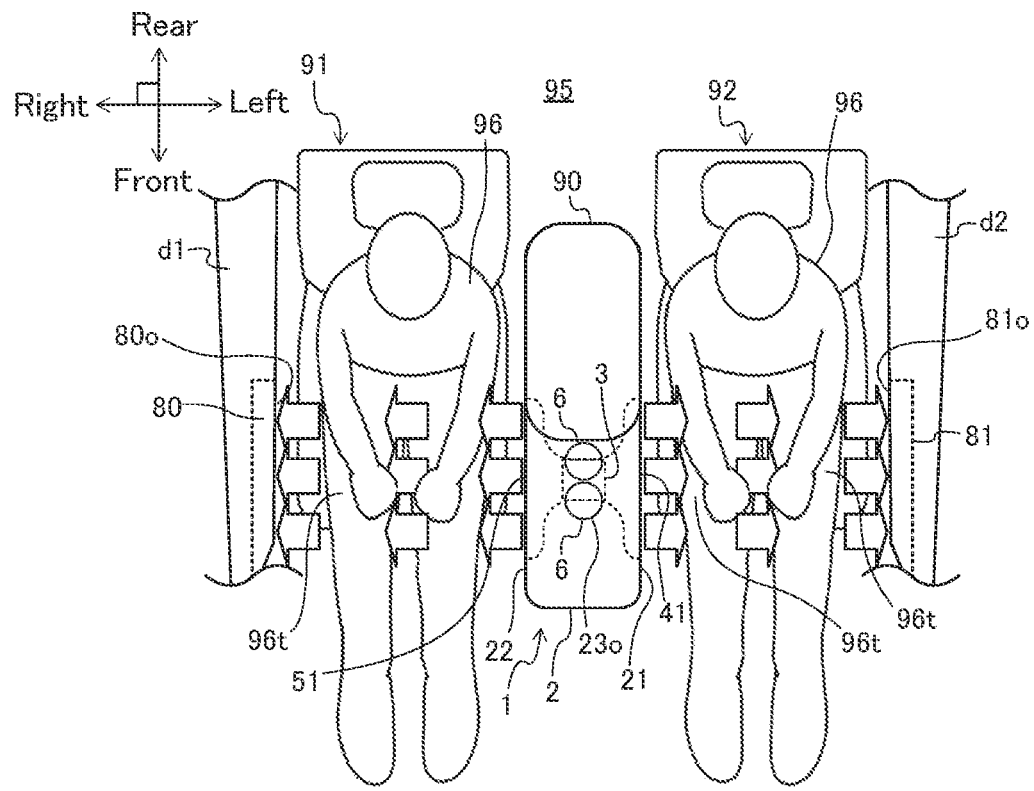
FIG. 1 schematically illustrates a proximity air-conditioning unit for vehicles according to Embodiment 1.

In recent years, as an air conditioner, a module component called a heating ventilation air conditioning (HVAC) system, which integrates air-conditioning functions such as a heater and a blower, has been widely used. By adopting the HVAC system, the size of the entire air conditioner is reduced, and the work for disposing the air conditioner on a vehicle is also simplified.

However, the inventor of the present invention has thought that incorporating an air conditioner for proximity air-conditioning into the HVAC system makes performing efficient and energy-saving air-conditioning, which is the object of the present invention, to be difficult.

That is, in the HVAC system, a temperature adjustment unit is disposed at a front side portion of the vehicle such as the back side of an instrument panel. Then, the air conditioner supplies air having a temperature adjusted through the temperature adjustment unit, through various ducts arranged over the entire vehicle compartment from the temperature adjustment unit. Hereinafter, if necessary, the air having a temperature adjusted through the temperature adjustment unit is sometimes referred to as conditioned air.

In such an HVAC system, the temperature adjustment unit and a blowout port for the conditioned air may be separated from each other for integrating the air-conditioning functions into one. As the distance between the temperature adjustment unit and the blowout port increases, the heat loss of the conditioned air and the pressure loss in the ducts increase, so that the cooling and heating efficiency deteriorates and the energy required for air-conditioning increases.

Also, in the embodiment of Patent Literature 1 described above, the temperature adjustment unit for proximity air-conditioning is diverted from the air-conditioning unit considered as an HVAC system.

The present inventor has dared to exclude proximity air-conditioning from the HVAC system, which is now becoming mainstream. That is, in the proximity air-conditioning unit for vehicles according to the present invention, a temperature adjustment unit is disposed inside a housing having a blowout port. Furthermore, the temperature adjustment unit is disposed at a position where conditioned air is efficiently supplied to the blowout port, specifically, between both end portions in a long-side direction of the blowout port. Accordingly, the temperature adjustment unit and the blowout port are made to have an appropriate positional relationship, so that the heat loss of the conditioned air and the pressure loss in a duct are considered to be reduced.

Moreover, in the proximity air-conditioning unit for vehicles according to the present invention, the upper end of the blowout port is located above the seat surface of a seat, and one end portion in the long-side direction of the blowout port is located on the front side in the front-back direction of the seat with respect to another end portion thereof. Accordingly, in the proximity air-conditioning unit for vehicles according to the present invention, conditioned air is blown to the thighs of an occupant sitting on the seat.

Here, warming the back and thighs of a human body in cold weather is considered good. Thus, in order to make an occupant perceive warmth with a smaller amount of heat, intensively warming the back and thighs of the occupant is reasonable.

The back is covered with the backrest of a seat, and is warmed by a seat heater in some cases. Therefore, the occupant is considered to more easily perceive coldness and warmth in the thighs than in the back. In the proximity air-conditioning unit for vehicles according to the present invention, as described above, the conditioned air is intensively blown to the entire thighs of the occupant. As a result, in the proximity air-conditioning unit for vehicles according to the present invention, efficient air-conditioning is performed, with a relatively small amount of heat generated by the temperature adjustment unit, such that the occupant perceives that the temperature is a comfortable temperature.

Owing to cooperation of these facts, in the proximity air-conditioning unit for vehicles according to the present invention, the cooling and heating efficiency is considered to be improved to reduce the energy required for air-conditioning.

Hereinafter, the proximity air-conditioning unit for vehicles according to the present invention is described.

Unless otherwise mentioned in particular, a numerical value range of "x to y" described in the present specification includes, in the range thereof, a lower limit "x" and an upper limit "y". A numerical value range may be formed by arbitrarily combining such upper limit values, lower limit values, and numerical values described in embodiments. In addition, numerical values arbitrarily selected within a numerical value range may be used as upper limit and lower limit numerical values.

The proximity air-conditioning unit for vehicles according to the present invention has a housing, a temperature adjustment unit, and a duct.

Among these components, the housing houses therein the temperature adjustment unit and the duct, and is disposed on a lateral side of a seat in a vehicle. Furthermore, the housing has a blowout port exposed on a surface thereof and facing the seat. The upper end of the blowout port is located above the seat surface of the seat.

Therefore, the housing may have an internal space capable of housing therein the duct and the temperature adjustment unit and at least a part of the housing may be located above the seat surface of the seat in a vehicle compartment.

Furthermore, the housing may be disposed between a driver seat and a passenger seat, or may be disposed between rear seats. In some cases, the housing may be disposed on a lateral side of only any one of the seats, for example, between the seat and a door.

The housing may be integrated with a vehicle-mounted device other than the temperature adjustment unit and the duct, or may house therein a vehicle-mounted device. Examples of the vehicle-mounted devices include a center console box, a drink holder, a table, a car navigation system or its monitor, and a touch panel for operating various devices. Each of these vehicle-mounted devices may be regarded as a part of the proximity air-conditioning unit for vehicles according to the present invention, or may be regarded as a device different from the proximity air-conditioning unit for vehicles according to the present invention.

The temperature adjustment unit includes a temperature adjuster and a blower.

The temperature adjuster is not particularly limited, and may be any adjuster that is usable for heating and/or cooling. For example, as the temperature adjuster, a general one capable of generating heat and/or cold, such as an electric heater, a thermoelectric element, and a heat pump, may be used. In consideration of reducing the size of the housing, a small temperature adjuster is preferably used, and for example, an electric heater, a heating/cooling device using a Peltier element, or the like is preferably used.

The blower is also not particularly limited, and a general blower may be used. For example, one having a general fan member such as a propeller fan or a sirocco fan and an electric motor for driving the fan member is suitably used as the blower in the proximity air-conditioning unit for vehicles according to the present invention. The blower may generate a flow of conditioned air from the temperature adjuster toward the blowout port of the duct, and may be disposed on the downstream side or the upstream side of the air flow with respect to the temperature adjuster. Moreover, the output of the blower is sufficient if energy enough to reach the blowout port is given to the conditioned air heated or cooled by the temperature adjuster, and the size of the blower is preferably a size that does not interfere with disposing the temperature adjuster, the duct, and another vehicle-mounted device if necessary, in the housing.

The temperature adjustment unit may be disposed in the vehicle compartment, or may be disposed under the floor of the vehicle together with a part of the housing. In the proximity air-conditioning unit for vehicles according to the present invention, the temperature adjuster and the blower of the temperature adjustment unit may be separate components, but are preferably integrated with each other in consideration of handleability.

Inside the housing, the duct is disposed in addition to the temperature adjustment unit described above. The duct is a member having a flow path portion therein and serving as a flow path for conditioned air. The duct is provided with an introduction port and a blowout port that serve as a boundary between the flow path portion and the outside. Of these ports, the introduction port is located on the downstream side of the air flow with respect to the temperature adjustment unit described above. That is, the conditioned air generated by the temperature adjustment unit is introduced through the introduction port into the flow path portion in the duct.

The temperature adjustment unit may be disposed away from the duct, but in order to introduce the conditioned air generated by the temperature adjustment unit into the flow path without loss, the distance between the introduction port and the temperature adjustment unit is preferably shorter, and, particularly preferably, there is no distance therebetween. Also, by disposing the temperature adjustment unit inside a portion on the introduction port side of the duct, the conditioned air generated by the temperature adjustment unit is introduced into the flow path portion without loss.

As described above, the blowout port is exposed on the surface of the housing and faces the seat. Therefore, the conditioned air in the flow path portion flows out through the blowout port into the vehicle compartment. Furthermore, the upper end of the blowout port is located above the seat surface of the seat, and one end portion in the long-side direction of the blowout port is located on the front side with respect to another end portion thereof in the front-back direction of the seat.

Here, the "one end portion in the long-side direction of the blowout port is located on the front side with respect to another end portion thereof in the front-back direction of the seat" means that "the long-side direction of the blowout port is directed in a direction that is substantially the same as the front-back direction of the seat". The long-side direction of the blowout port does not have to coincide with the front-back direction of the seat, and the angle between both directions is preferably not larger than 90°, more preferably not larger than 45°, further preferably not larger than 30°, and particularly preferably not larger than 15°.

In addition, the "front-back direction of the seat" is also regarded as the "direction of the seat", and coincides with the direction in which a buttock and a knee of an occupant sitting on the seat are connected. The knee side of the occupant is the front side of the seat, and the buttock side of the occupant is the rear side of the seat. The front-back direction of the seat in the proximity air-conditioning unit for vehicles according to the present invention may be the same as or different from the traveling direction of the vehicle. In a proximity air-conditioning unit for vehicles according to each embodiment described later, the front-back direction of the seat and the traveling direction of the vehicle coincide with each other, but, the front-back direction does not coincide with the traveling direction of the vehicle in some cases, for example, in the case where a plurality of seats are arranged side by side in the traveling direction of the vehicle. In the case where a plurality of seats are arranged side by side in the traveling direction of the vehicle, a direction substantially orthogonal to the traveling direction of the vehicle is the front-back direction of the seat.

By directing the long-side direction of the blowout port in a direction that is substantially the same as the front-back direction of the seat, the conditioned air flowing out from the blowout port is blown to the entireties of the thighs between the buttocks and the knees of the occupant, so that the thighs of the occupant are efficiently warmed.

In order to warm or cool the thighs of the occupant in a sufficient range, the length in the long-side direction of the blowout port, which is a blowout port for the conditioned air, is preferably increased to some extent. Specifically, the length in the long-side direction of the blowout port is preferably not shorter than 50%, more preferably not shorter than 70%, and further preferably not shorter than 80%, of the length in the front-back direction of the seat surface of the seat.

The actual length in the long-side direction of the blowout port is preferably not shorter than 150 mm, more preferably not shorter than 170 mm, and particularly preferably not shorter than 200 mm.

Since the blowout port has the long-side direction, the blowout port also has a short-side direction. The ratio of the length in the long-side direction to the length in the short-side direction of the blowout port is not particularly limited, but from the viewpoint of energy saving, the area of the blowout port is preferably not excessive. Therefore, the length in the short-side direction of the blowout port is preferably shorter. Specifically, the length in the long-side direction of the blowout port is preferably not shorter than two times, more preferably not shorter than three times, further preferably not shorter than five times, and particularly preferably not shorter than ten times the length in the short-side direction of the blowout port. The long-side direction and the short-side direction are preferably orthogonal to each other, but may intersect at an angle other than a right angle. In this case, the intersection angle (inferior angle) between both directions is preferably not smaller than 45°, more preferably not smaller than 60°, and further preferably not smaller than 75°.

Also, in order to more efficiently warm or cool the thighs of the occupant, causing the conditioned air to flow on the thighs of the occupant is considered good. Therefore, the blowout port is preferably located further above the seat surface of the seat. Preferably, the upper end of the blowout port is located above the seat surface of the seat, and the distance in the up-down direction between the upper end of the blowout port and the seat surface is not shorter than 50 mm. Moreover, in this case, more preferably, the lower end of the blowout port is also located above the seat surface, and the distance in the up-down direction between the lower end of the blowout port and the seat surface is not shorter than 10 mm.

Examples of more preferable ranges of the distance in the up-down direction between the upper end of the blowout port and the seat surface include not shorter than 70 mm, not shorter than 100 mm, and not shorter than 150 mm. There is no particular upper limit to the distance in the up-down direction between the upper end of the blowout port and the seat surface, but examples of preferable ranges thereof include not longer than 250 mm, not longer than 230 mm, and not longer than 200 mm.

Also, examples of more preferable ranges of the distance in the up-down direction between the lower end of the blowout port and the seat surface include not shorter than 20 mm, not shorter than 40 mm, and not shorter than 80 mm. There is no particular upper limit to the distance in the up-down direction between the lower end of the blowout port and the seat surface, but examples of preferable ranges thereof include not longer than 170 mm, not longer than 150 mm, and not longer than 140 mm.

Moreover, the conditioned air flowing from the thigh close to the blowout port toward the thigh far from the blowout port, of the pair of thighs of the occupant, is considered good. In order to cause the conditioned air to flow on the two thighs of the occupant, a suction duct for sucking the conditioned air may be provided on a lateral side of the seat opposite to the housing. Accordingly, occurrence of turbulence or staying of the conditioned air above the thighs of the occupant is suppressed, and the conditioned air having a temperature adjusted appropriately is continuously supplied to the thighs of the occupant. Therefore, in this case, the thighs of the occupant are efficiently warmed.

The suction duct has a suction port located on the blowout port side and a discharge port located on the side opposite from the suction port. While the duct inside the housing is considered as a duct for air supply, the suction duct is considered as a duct for discharge.

The discharge port of the suction duct may communicate with the outside of the vehicle compartment, or may communicate with the vehicle compartment. Moreover, if necessary, a suction duct blower may be provided in addition to the above suction duct. The suction duct blower may be one capable of generating an air flow in the suction duct from the suction port side toward the discharge port side. In the case where the housing is disposed between the driver seat and the passenger seat, the suction duct and the suction duct blower are preferably provided at a side door on the side opposite from the housing.

Hereinafter, the proximity air-conditioning unit for vehicles according to the present invention is described by means of specific examples.

Embodiment 1

Figure 2:
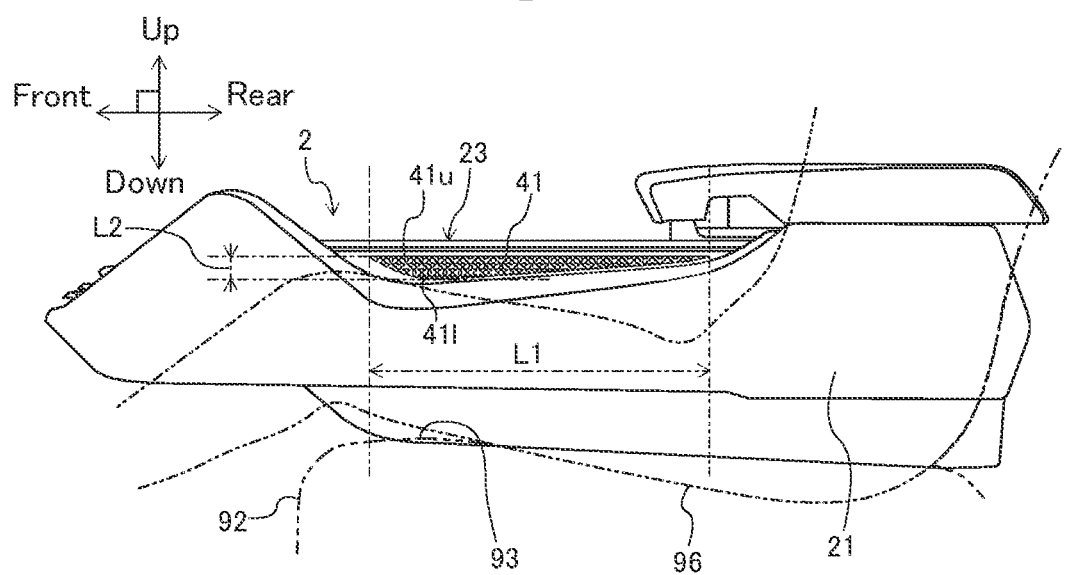
FIG. 2 schematically illustrates the proximity air-conditioning unit for vehicles according to Embodiment 1.
Figure 3:
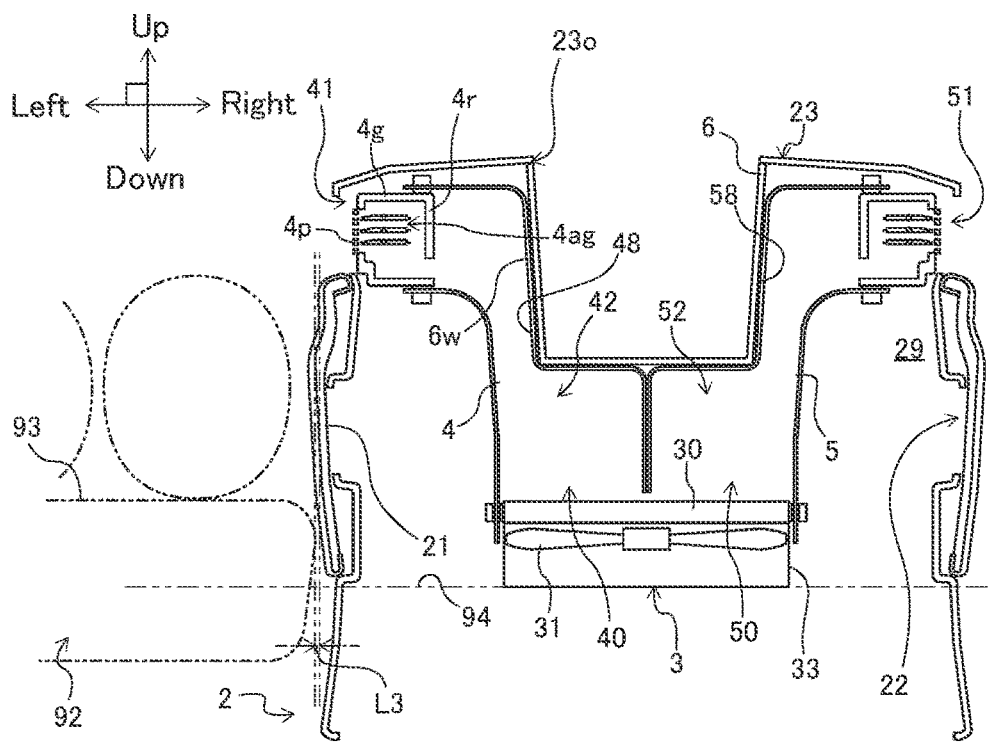
FIG. 3 schematically illustrates the proximity air-conditioning unit for vehicles according to Embodiment 1.
Figure 4:
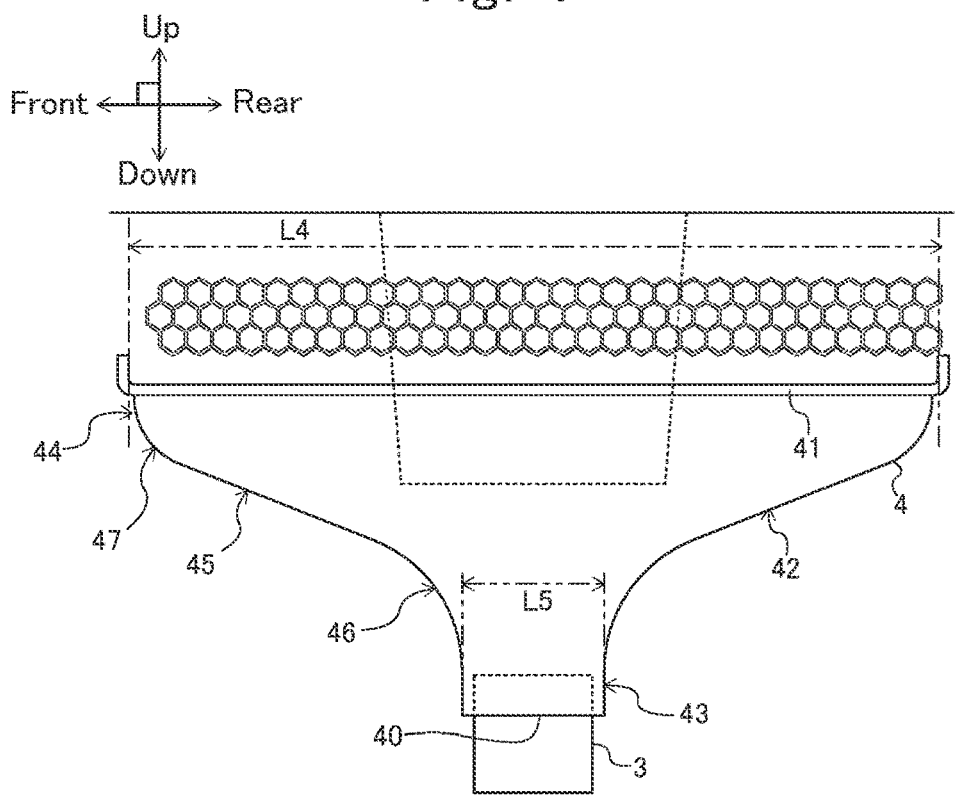
FIG. 4 schematically illustrates the positional relationship between a blowout port, a duct, and a temperature adjustment unit in the proximity air-conditioning unit for vehicles according to Embodiment 1.
Figure 5:
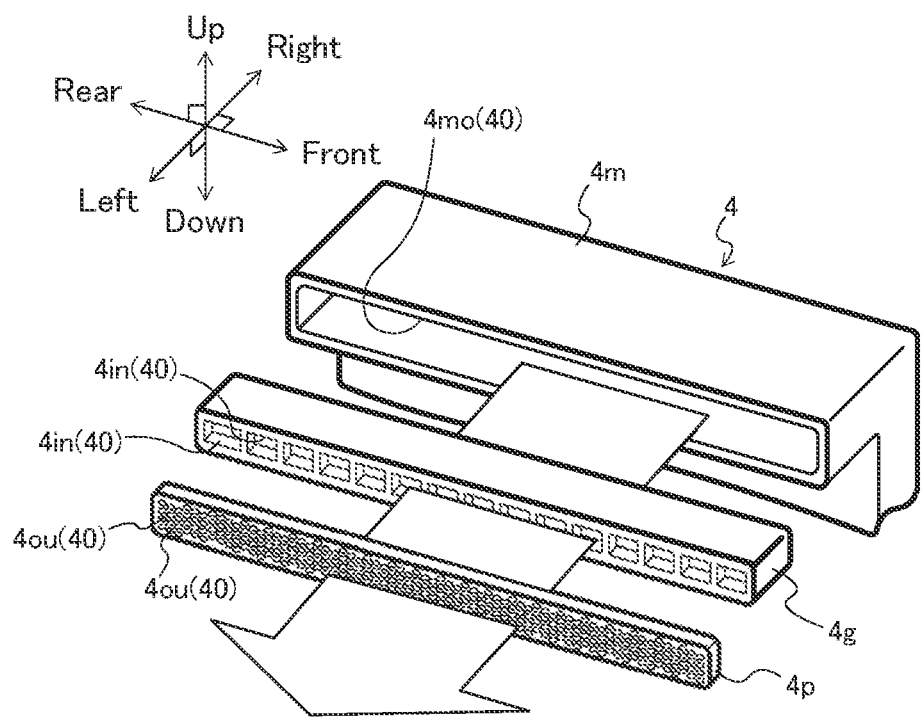
FIG. 5 schematically illustrates the blowout port in the proximity air-conditioning unit for vehicles according to Embodiment 1.

A proximity air-conditioning unit for vehicles according to Embodiment 1 is integrated with a center console box of a vehicle. FIG. 1 to FIG. 3 schematically illustrate the proximity air-conditioning unit for vehicles according to Embodiment 1. FIG. 4 schematically illustrates the positional relationship between a blowout port, a duct, and a temperature adjustment unit in the proximity air-conditioning unit for vehicles according to Embodiment 1. FIG. 5 schematically illustrates the blowout port. FIG. 1 illustrates the proximity air-conditioning unit for vehicles according to Embodiment 1 as viewed from above, FIG. 2 illustrates the proximity air-conditioning unit for vehicles according to Embodiment 1 as viewed from the passenger seat side, and FIG. 3 illustrates a cross-section of the proximity air-conditioning unit for vehicles according to Embodiment 1 as viewed from the rear side. In addition, FIG. 4 illustrates the blowout port, the duct, and the temperature adjustment unit in the proximity air-conditioning unit for vehicles according to Embodiment 1 as viewed from the passenger seat side. FIG. 5 illustrates a state where each member forming the blowout port is disassembled. Hereinafter, upper and lower mean the upper side and the lower side in the vertical direction, and front, rear, left, and right mean the front, the rear, the left, and the right in the traveling direction of the vehicle.

The proximity air-conditioning unit 1 for vehicles according to Embodiment 1 has a housing 2, a temperature adjustment unit 3, two ducts 4 and 5, and a drink holder 6.

As shown in FIG. 1, the proximity air-conditioning unit 1 for vehicles according to Embodiment 1 is integrated with a center console box 90 of the vehicle and disposed between a driver seat 91 and a passenger seat 92. The driver seat 91 may be rephrased as a second seat, and the passenger seat 92 may be rephrased as a first seat.

As shown in FIG. 2, the housing 2 has a long-side direction directed in the front-back direction. As shown in FIG. 3, an internal space 29 is formed in the housing 2. The temperature adjustment unit 3, the two ducts 4 and 5, and the drink holder 6 are housed in the internal space 29.

As described above, the proximity air-conditioning unit 1 for vehicles according to Embodiment 1 is disposed between the driver seat 91 and the passenger seat 92. The internal space 29 of the housing 2 described above is defined by four side walls (a left side wall 21, a right side wall 22, a front side wall which is not shown in the drawing, a rear side wall which is not shown in the drawing) and one top wall 23. The left side wall 21 of the housing 2 is located on the passenger seat 92 side, the right side wall 22 is located on the driver seat 91 side, the front side wall which is not shown in the drawing is located on the front side of the left side wall 21 and the right side wall 22, and the rear side wall which is not shown in the drawing is located on the rear side of the left side wall 21 and the right side wall 22. The top wall 23 is located above the left side wall 21, the right side wall 22, the front side wall, and the rear side wall. As shown in FIG. 3, the top wall 23 of the housing 2 is located above seat surfaces 93 of the seats, that is, the passenger seat 92 and the driver seat 91 which is not shown in the drawing.

As shown in FIG. 1 and FIG. 3, a top opening 23o which communicates with the internal space 29 is provided in a substantially central portion of the top wall 23 of the housing 2.

The drink holder 6 is inserted into the top opening 23o and integrated with a peripheral edge portion of the top opening 23o in the top wall 23. The drink holder 6 has a case shape which is open upward. A peripheral wall 6w of the drink holder 6 is exposed in the internal space 29 of the housing 2.

The temperature adjustment unit 3 includes a temperature adjuster 30, a blower 31, and a case 33 in which the temperature adjuster 30 and the blower 31 are housed. In the proximity air-conditioning unit 1 for vehicles according to Embodiment 1, a positive temperature coefficient (PTC) heater, which is a kind of electric heater, is used as the temperature adjuster 30, and one having a propeller fan and an electric motor is used as the blower 31.

The temperature adjustment unit 3 is disposed on a floor 94 of the vehicle. The case 33 is open upward, and the temperature adjuster 30 is disposed above the blower 31 in the case 33. Although not shown in particular, a large number of slits are provided in a bottom portion of the case 33, that is, a lower portion of the case 33. Therefore, air is introduced into the case 33 through the bottom portion.

The two ducts 4 and 5 having substantially the same shape are disposed above the temperature adjustment unit 3 in the housing 2, that is, on the downstream side of the air flow with respect to the temperature adjustment unit 3, so as to be bilaterally symmetric with each other. Of the two ducts 4 and 5, the duct disposed on the left side, that is, on the passenger seat 92 side, is referred to as a first duct 4, and the duct disposed on the right side, that is, on the driver seat 91 side, is referred to as a second duct 5.

The first duct 4 has a tubular shape in which both end portions in the long-side direction thereof, that is, in the axial direction thereof, are open. One opening in the first duct 4 is referred to as a first introduction port 40, and the other opening in the first duct 4 is referred to as a first blowout port 41. A flow path which is provided inside the first duct 4 and which provides communication between the first introduction port 40 and the first blowout port 41 is referred to as a first flow path portion 42. In the first duct 4, the first introduction port 40 is directed downward, and the first blowout port 41 is directed upward and leftward. The first duct 4 has a substantially L tubular shape.

The first introduction port 40 is located above the temperature adjustment unit 3 and faces the temperature adjuster 30. The first blowout port 41 is located at the left side wall 21 of the housing 2. Specifically, a gap is provided between the upper end of the left side wall 21 and the top wall 23. A portion on the first blowout port 41 side of the first duct 4 is fixed to the left side wall 21, and the first blowout port 41 is exposed in the above gap and faces the passenger seat 92.

As shown in FIG. 2, one end portion in the long-side direction of the first blowout port 41 is located on the front side, and another end portion thereof is located on the rear side.

The first blowout port 41 is located above the seat surface 93 of the passenger seat 92, and the long-side direction thereof is directed in the front-back direction. The driver seat 91 and the passenger seat 92 are directed in the traveling direction of the vehicle, and the front-back direction of the driver seat 91 and the front-back direction of the passenger seat 92 coincide with the traveling direction of the vehicle. Therefore, the long-side direction of the first blowout port 41 in the proximity air-conditioning unit 1 for vehicles according to Embodiment 1 is considered to be directed in the traveling direction of the vehicle, that is, in the front-back direction.

The maximum value of a length L1 of the first blowout port 41 in the long-side direction, that is, in the front-back direction, is about 200 mm, and the maximum value of a length L2 of the first blowout port 41 in the short-side direction, that is, in the up-down direction, is about 10 mm.

Furthermore, an upper end 41u of the first blowout port 41 is located above the seat surface 93 of the passenger seat 92.

The distance in the up-down direction between the upper end 41u of the first blowout port 41 and the seat surface 93 of the passenger seat 92 is about 150 mm, and the distance in the up-down direction between a lower end 41l of the first blowout port 41 and the seat surface 93 of the passenger seat 92 is about 140 mm.

The conditioned air generated by the temperature adjustment unit 3 and introduced into the first duct 4 blows out through such a first blowout port 41 to a vehicle compartment 95. Since the long-side direction of the first blowout port 41 is directed in the front-back direction, the conditioned air blown out from the first blowout port 41 is blown to a space above the passenger seat 92, that is, the entireties of thighs 96t of an occupant 96 sitting on the passenger seat 92. Therefore, with the proximity air-conditioning unit 1 for vehicles according to Embodiment 1, the occupant 96 is effectively warmed, and thus efficient air-conditioning is considered to be performed.

As shown in FIG. 3, in the proximity air-conditioning unit for vehicles according to Embodiment 1, there is almost no distance between the first blowout port 41 and the passenger seat 92, and more specifically, there is almost no distance L3 in the right-left direction therebetween.

In the proximity air-conditioning unit 1 for vehicles according to Embodiment 1, the first blowout port 41 and the passenger seat 92 are close to each other, and the conditioned air blows out from the first blowout port 41 toward the passenger seat 92, more specifically, toward the thighs 96t of the occupant 96 sitting on the passenger seat 92. Therefore, with the proximity air-conditioning unit 1 for vehicles according to Embodiment 1, efficient air-conditioning is possible.

For efficiently performing air-conditioning, the distance L3 in the right-left direction between the first blowout port 41 and the passenger seat 92 is preferably shorter. Examples of preferable ranges of the distance L3 between the first blowout port 41 and the passenger seat 92 include not longer than 5 cm, not longer than 3 cm, and not longer than 2 cm.

Furthermore, as shown in FIG. 4, the temperature adjustment unit 3 is disposed between both end portions in the long-side direction of the first blowout port 41. Accordingly, the temperature adjustment unit 3 and the first blowout port 41 are made to have an appropriate positional relationship, and the heat loss of the conditioned air and the pressure loss in the first duct 4 are reduced. In addition, in the proximity air-conditioning unit for vehicles according to Embodiment 1, the temperature adjustment unit 3 is disposed substantially at the center in the long-side direction of the first blowout port 41. Accordingly, the proximity air-conditioning unit for vehicles according to Embodiment 1 is advantageous in evenly distributing the conditioned air in the front-back direction.

As shown in FIG. 4, the opening diameter of the first blowout port 41 of the first duct 4 is much larger than the opening diameter of the first introduction port 40. Specifically, an opening diameter L4 of the first blowout port 41 in the front-back direction is larger than five times an opening diameter L5 of the first introduction port 40 in the front-back direction. In addition, the flow path cross-sectional area of the first blowout port 41 is much larger than the flow path cross-sectional area of the first introduction port 40. The first flow path portion 42 which provides communication the first introduction port 40 and the first blowout port 41 provides smooth communication between the first introduction port 40 and the first blowout port 41 such that the flow path cross-sectional area of the first duct 4 gradually increases.

In the proximity air-conditioning unit 1 for vehicles according to Embodiment 1, the flow path cross-sectional area of the first duct 4 gradually increases from the first introduction port 40 side toward the first blowout port 41 side. Accordingly, turbulence, etc., of the conditioned air is suppressed inside the first duct 4, that is, in the first flow path portion 42 of the first duct 4, so that the pressure loss in the first duct 4 is reduced. In addition, the first duct 4 has a first introduction flow path portion 43 and a first blowout flow path portion 44 each having almost no change in a flow path cross-sectional area thereof. Accordingly, the conditioned air is introduced into the first duct 4 while being straightened, and is blown out from the first duct 4 while being straightened. Owing to cooperation of these facts, heat loss is suppressed in the first duct 4 in the proximity air-conditioning unit 1 for vehicles according to Embodiment 1.

In the proximity air-conditioning unit 1 for vehicles according to Embodiment 1, the first flow path portion 42 has the first introduction flow path portion 43 which is an end portion on the first introduction port 40 side, the first blowout flow path portion 44 which is an end portion on the first blowout port 41 side, and a first communication flow path portion 45 which provides communication between the first introduction flow path portion 43 and the first blowout flow path portion 44. In the first introduction flow path portion 43 and the first blowout flow path portion 44, there is almost no change in the flow path cross-sectional area thereof.

On the other hand, in the first communication flow path portion 45, the flow path cross-sectional area thereof gradually increases at a substantially constant rate from the first introduction flow path portion 43 toward the first blowout flow path portion 44. Furthermore, at a first boundary portion 46 which is the boundary portion between the first communication flow path portion 45 and the first introduction flow path portion 43 and at a second boundary portion 47 which is the boundary portion between the first communication flow path portion 45 and the first blowout flow path portion 44, the rate of change in the flow path cross-sectional area changes rapidly. The curvature of the first boundary portion 46 is about 1/1.5 cm, and the curvature of the second boundary portion 47 is about 1/0.5 cm.

Since the first duct 4 in the proximity air-conditioning unit 1 for vehicles according to Embodiment 1 has such a first communication flow path portion 45, such a first boundary portion 46, such a first introduction flow path portion 43, such a second boundary portion 47, and such a first blowout flow path portion 44, the first duct 4 reduces the pressure loss of the conditioned air and causes the conditioned air to smoothly flow therein. Accordingly, the heat of the conditioned air is inhibited from being lost before the conditioned air reaches the occupant 96, and thus the heat loss of the proximity air-conditioning unit 1 for vehicles according to Embodiment 1 is reduced.

The first introduction flow path portion 43 and the first blowout flow path portion 44 preferably have a shape in which the flow path cross-sectional area does not change, and particularly preferably have a straight tubular shape, but the flow path cross-sectional areas of these flow path portions may change slightly.

For example, in the cross-section shown in FIG. 4, that is, the cross-section of the first duct 4 taken parallel to the long-side direction of the first blowout port 41 and along the axial direction of the first duct 4, the outer periphery of the first introduction flow path portion 43 intersects the long-side direction of the first blowout port 41 at an intersection angle of preferably 70 to 110°, more preferably 80 to 100°, and further preferably 85 to 95°. Of course, the outer periphery of the first introduction flow path portion 43 is particularly preferably orthogonal to the long-side direction of the first blowout port 41. Similarly, the outer periphery of the first blowout flow path portion 44 intersects the long-side direction of the first blowout port 41 at an intersection angle of preferably 70 to 110°, more preferably 80 to 100°, and further preferably 85 to 95°, and is particularly preferably orthogonal to the long-side direction of the first blowout port 41.

The curvature of the first boundary portion 46 is rephrased as the curvature of the outer periphery of the first boundary portion 46, and the curvature of the second boundary portion 47 is rephrased as the curvature of the outer periphery of the second boundary portion 47. The curvature of the first boundary portion 46 is preferably less than the curvature of the second boundary portion 47, more preferably not larger than ½ times the curvature of the second boundary portion 47, and further preferably not larger than ⅓ times the curvature of the second boundary portion 47. Examples of preferable ranges of the curvature of the first boundary portion 46 include the range of 1/0.5 to 1/10 cm, the range of 1/1.0 to 1/3 cm, and the range of 1/1.0 to 1/2 cm. In addition, examples of preferable ranges of the curvature of the second boundary portion 47 include the range of 1/0.1 to 1/5 cm, the range of 1/0.2 to 1/2 cm, and the range of 1/0.3 to 1/1 cm.

As shown in FIG. 5, the first duct 4 has a duct body 4m having a tubular shape, and a guide fin member 4g and a perforated plate 4p integrated with a portion on the first blowout port 41 side of the duct body 4m. As shown in FIG. 5 and FIG. 3, the guide fin member 4g is a substantially box-shaped member having a large number of inner openings 4in having a slit shape, is attached to the portion on the first blowout opening 41 side of the duct body 4m, and covers a duct opening 4mo, which is an opening of the duct body 4m, from the outside, that is, from the left side. The perforated plate 4p is a punched metal having a large number of outer openings 4ou having a through-hole shape, is attached to the guide fin member 4g, and covers the inner openings 4in of the guide fin member 4g from the outside, that is, from the left side. Therefore, the first blowout port 41 in the proximity air-conditioning unit 1 for vehicles according to Embodiment 1 is considered substantially as a collection of small openings formed by the first duct opening 4mo of the duct body 4m, the inner openings 4in of the guide fin member 4g, and the outer openings 4ou of the perforated plate 4p.

In the proximity air-conditioning unit 1 for vehicles according to Embodiment 1, the opening diameters of the inner openings 4in of the guide fin member 4g are about 8 to 40 mm, and the distance between the inner openings 4in adjacent to each other is about 2 to 15 mm. In addition, the opening diameters of the outer openings 4ou of the perforated plate 4p are about 2 to 6 mm, and the distance between the outer openings 4ou adjacent to each other is about 5 to 10 mm.

As shown in FIG. 3, a wind direction guide portion 4ag in which a plurality of blades are arranged is provided inside the guide fin member 4g. The wind direction guide portion 4ag further has an operation end (not shown) for adjusting the directions of the blades. The wind direction guide portion 4ag guides the blowout direction of the conditioned air.

An interference rib 4r is provided inside the guide fin member 4g. The interference rib 4r extends in the front-back direction and projects in the up-down direction inside the first duct 4, that is, in the first flow path portion 42. In other words, the interference rib 4*r* extends along the long-side direction of the first blowout port 41 and projects so as to intersect the axial direction of the first duct 4. The interference rib 4*r* is integrally molded with the guide fin member 4*g* by injection molding.

The interference rib 4*r* has a function of distributing the conditioned air flowing through the first flow path portion 42, to the entirety in the long-side direction of the first blowout port 41. In the proximity air-conditioning unit 1 for vehicles according to Embodiment 1, since the interference rib 4*r* is provided, a relatively small amount of the conditioned air is efficiently blown to the occupant 96. Owing to this fact as well, with the proximity air-conditioning unit 1 for vehicles according to Embodiment 1, energy-saving and efficient air-conditioning is possible.

In the proximity air-conditioning unit 1 for vehicles according to Embodiment 1, the opening areas of the duct opening 4*mo*, the inner openings 4*in*, and the outer openings 4*ou* become smaller in the order of duct opening 4*mo*>inner openings 4*in*>outer openings 4*ou*. Thus, the flow path for the conditioned air flowing in the first duct 4 is narrowed stepwise at the first blowout port 41. Therefore, the flow velocity of the conditioned air in the first duct 4 is increased at the first blowout port 41, and the conditioned air blown out from the first blowout port 41 is diffused. Therefore, with the proximity air-conditioning unit 1 for vehicles according to Embodiment 1, a relatively small amount of the conditioned air is effectively supplied to the occupant 96.

As described above, the second duct 5 has substantially the same shape as the first duct 4, and is disposed so as to be bilaterally symmetric with the first duct 4. One opening in the second duct 5 is referred to as a second introduction port 50, and the other opening in the second duct 5 is referred to as a second blowout port 51. A flow path which is provided inside the second duct 5 and which provides communication between the second introduction port 50 and the second blowout port 51 is referred to as a second flow path portion 52. In the second duct 5, the second introduction port 50 is directed downward, and the second blowout port 51 is directed upward and rightward.

The second introduction port 50 is disposed above the temperature adjustment unit 3 on the right side of the first introduction port 40 and faces the temperature adjuster 30. The second blowout port 51 is fixed to the right side wall 22 of the housing 2 and is also exposed in the gap between the upper end of the right side wall 22 and the top wall 23.

The shape of each portion of the second duct 5 is the same as the shape of the corresponding portion of the first duct 4. Therefore, the second duct 5 has the same effects as the first duct 4.

As shown in FIG. 3, the drink holder 6 provided in the proximity air-conditioning unit 1 for vehicles according to Embodiment 1 is disposed between the first duct 4 and the second duct 5. Furthermore, the first duct 4 and the second duct 5 each have a portion adjacent to the outside of the drink holder 6. The portion, adjacent to the drink holder 6, of the first duct 4 is referred to as a first holder adjacent portion 48, and the portion, adjacent to the drink holder 6, of the second duct 5 is referred to as a second holder adjacent portion 58. The first holder adjacent portion 48 and the second holder adjacent portion 58 are collectively referred to as holder adjacent portion 48, 58.

In the proximity air-conditioning unit 1 for vehicles according to Embodiment 1, there is almost no distance between the holder adjacent portion 48, 58 and the drink holder 6. In addition, the length in the axial direction of the holder adjacent portion 48, 58 is about 100 mm. In other words, in a cross-section in the axial direction of the first duct 4, the length of the portion where there is almost no distance from the drink holder 6 is about 100 mm.

Here, the "portion where there is almost no distance from the drink holder 6" is also rephrased as a "portion where the distance from the drink holder 6 is not larger than 1 mm". In addition, the cross-section in the axial direction of the first duct 4 means a cross-section obtained by cutting the first duct 4 along the axial direction so as to include the first introduction port 40 and the first blowout port 41 as illustrated in FIG. 3. The same applies to the second duct 5.

In the proximity air-conditioning unit 1 for vehicles according to Embodiment 1, since the holder adjacent portions 48 and 58 are provided in the first duct 4 and the second duct 5, respectively, there is an advantage that beverages held in the drink holder 6 are effectively kept warm by the exhaust heat of the first duct 4 and the second duct 5. In addition, since the drink holder 6 is located outside the first duct 4 and the second duct 5, the pressure loss in the first duct 4 and the second duct 5 is not affected. Therefore, with the proximity air-conditioning unit 1 for vehicles according to Embodiment 1, energy-saving and efficient air-conditioning is performed, and beverages are kept warm at the same time.

Examples of preferable ranges of the distance between the holder adjacent portion 48, 58 and the drink holder 6 for efficiently keeping beverages warm include not larger than 10 mm, not larger than 7 mm, not larger than 5 mm, and not larger than 3 mm. In addition, examples of preferable ranges of the length in the axial direction of the holder adjacent portion 48, 58 for efficiently keeping beverages warm include not shorter than 50 mm, not shorter than 70 mm, and not shorter than 100 mm.

As shown in FIG. 1, suction ducts 80 and 81 are disposed at a side door d1 on the driver seat 91 side and a side door d2 on the passenger seat 92 side, respectively. Suction duct blowers which are not shown in the drawing are attached to the suction ducts 80 and 81. Each of the suction ducts 80 and 81 has a tubular shape with two openings. The first suction duct 81 which is one of the two suction ducts 80 and 81 is disposed at the side door d2 on the passenger seat 92 side, and a first suction port 810 which is one opening in the first suction duct 81 is open in the side door d2 on the passenger seat 92 side. The first suction port 810 faces the first blowout port 41 and sucks the conditioned air blown out from the first blowout port 41. Therefore, above the thighs 96*t* of the occupant 96 sitting on the passenger seat 92, the conditioned air smoothly flows from the housing 2 side to the side door d2 side, and the conditioned air having a temperature adjusted appropriately is continuously supplied to the thighs 96*t* of the occupant 96.

Similarly, the second suction duct 80 which the other of the two suction ducts 80 and 81 is disposed at the side door d1 on the driver seat 91 side, and a second suction port 80*o* of the second suction duct 80 faces the second blowout port 51 and sucks the conditioned air blown out from the second blowout port 51. Therefore, also above the thighs 96*t* of the occupant 96 sitting on the driver seat 91, the conditioned air smoothly flows from the housing 2 side to the side door d1 side, and the conditioned air having a temperature adjusted appropriately is continuously supplied to the thighs 96*t* of the occupant 96.

As described above, since the proximity air-conditioning unit 1 for vehicles according to Embodiment 1 includes the suction ducts 80 and 81, the thighs 96*t* of the occupants 96 are more efficiently warmed. The suction ducts 80 and 81 are considered to form an air curtain of the conditioned air near the thighs 96t of the occupants 96.

Embodiment 2

A proximity air-conditioning unit for vehicles according to Embodiment 2 is substantially the same as the proximity air-conditioning unit for vehicles according to Embodiment 1, except for the shapes of the first duct and the second duct.

Figure 6:
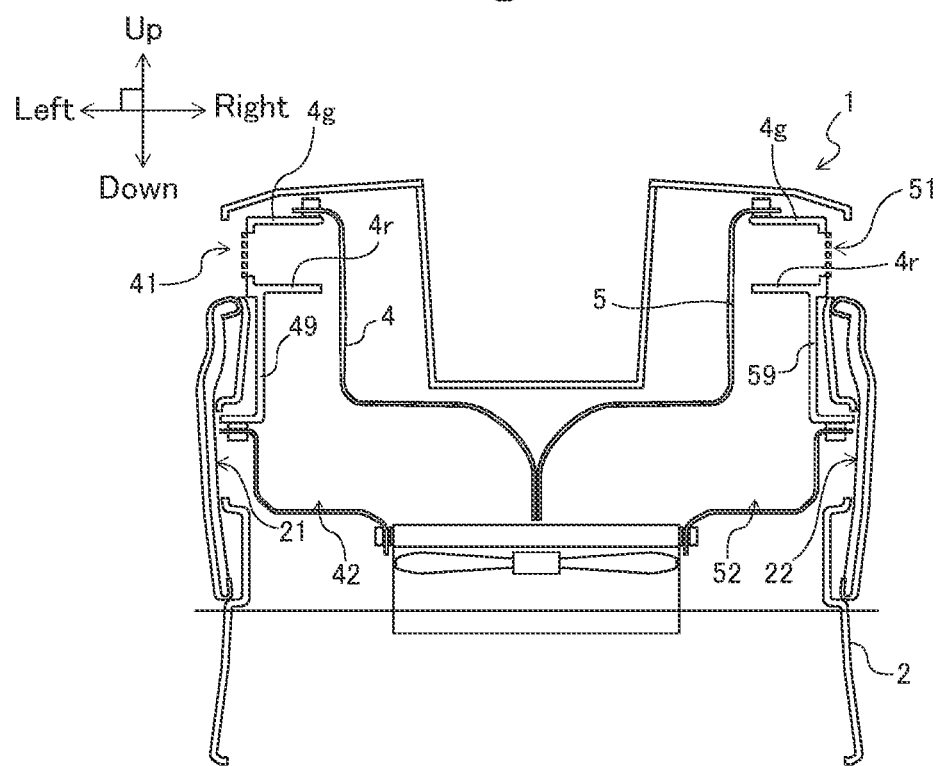
FIG. 6 schematically illustrates a proximity air-conditioning unit for vehicles according to Embodiment 2.

FIG. 6 schematically illustrates the proximity air-conditioning unit for vehicles according to Embodiment 2. FIG. 6 illustrates a cross-section of the proximity air-conditioning unit for vehicles according to Embodiment 2 as viewed from the rear side.

Similar to the proximity air-conditioning unit 1 for vehicles according to Embodiment 1, the proximity air-conditioning unit 1 for vehicles according to Embodiment 2 has a first duct 4 and a second duct 5. The first duct 4 and the second duct 5 have substantially the same shape and are disposed so as to be bilaterally symmetric with each other.

The first duct 4 in the proximity air-conditioning unit 1 for vehicles according to Embodiment 2 has a first side wall adjacent portion 49 extending vertically along a side wall on the passenger seat 92 side, that is, the left side wall 21, of the housing 2. The conditioned air flowing in the first duct 4 heats the first duct 4 itself. Then, the first side wall adjacent portion 49 of the first duct 4 heats the left side wall 21 of the housing 2. If the side wall on the passenger seat 92 side of the housing 2 is heated, air-conditioning is performed in the vicinity of the passenger seat 92 by heat conduction. That is, in the proximity air-conditioning unit 1 for vehicles according to Embodiment 2, air-conditioning is performed not only by the conditioned air itself blown out from the first blowout port 41 but also by the exhaust heat of the first duct 4.

The second duct 5 also has a similar second side wall adjacent portion 59. Thus, in the vicinity of the driver seat 91, similarly, not only air-conditioning by the conditioned air and but also air-conditioning by the exhaust heat of the second duct 5 is performed.

As described above, with the proximity air-conditioning unit 1 for vehicles according to Embodiment 2 as well, energy-saving and efficient air-conditioning is performed.

In the proximity air-conditioning unit 1 for vehicles according to Embodiment 2, each of the distance between the first side wall adjacent portion 49 of the first duct 4 and the left side wall 21 of the housing 2 and the distance between the second side wall adjacent portion 59 of the second duct 5 and the right side wall 22 of the housing 2 is about 20 mm. In addition, each of the lengths in the axial direction of the first side wall adjacent portion 49 and the second side wall adjacent portion 59 is about 100 mm. In other words, in a cross-section in the axial direction of the first duct 4, the length of the portion where the distance from the left side wall 21 is 20±5 mm is about 100 mm, and, in a cross-section in the axial direction of the second duct 5, the length of the portion where the distance from the right side wall 22 is 20±5 mm is also about 100 mm. The cross-sections in the axial direction of the first duct 4 and the second duct 5 are as described in Embodiment 1.

Considering the efficient use of exhaust heat, examples of preferable ranges of the distance between each side wall adjacent portion 49, 59 and the side wall 21, 22 facing the side wall adjacent portion 49, 59 include not larger than 30 mm, not larger than 20 mm, not larger than 10 mm, and not larger than 5 mm. In addition, examples of preferable ranges of the length in the axial direction of each side wall adjacent portion 49, 59 include not shorter than 50 mm, not shorter than 70 mm, and not shorter than 100 mm.

In the proximity air-conditioning unit 1 for vehicles according to Embodiment 2, a side wall on the housing 2 side of the guide fin member 4g extends downward and forms a part of the first side wall adjacent portion 49 or the second side wall adjacent portion 59. The interference rib 4r is provided on the wall surface, of the guide fin member 4g, which forms a part of the first side wall adjacent portion 49 or the second side wall adjacent portion 59. More specifically, the interference rib 4r in the proximity air-conditioning unit 1 for vehicles according to Embodiment 2 extends in the front-back direction and projects in the right-left direction. In other words, similar to the interference rib 4r in the proximity air-conditioning unit 1 for vehicles according to Embodiment 1, the interference rib 4r extends along the long-side direction of the first blowout port 41 or the second blowout port 51 and projects so as to intersect the axial direction of the first duct 4 or the second duct 5.

Similar to the interference rib 4r in the proximity air-conditioning unit 1 for vehicles according to Embodiment 1, the interference rib 4r in the proximity air-conditioning unit 1 for vehicles according to Embodiment 2 has a function of distributing the conditioned air flowing through the first flow path portion 42 or the second flow path portion 52, to the entirety in the long-side direction of the first blowout port 41 or the second blowout port 51. Therefore, with the proximity air-conditioning unit 1 for vehicles according to Embodiment 2 as well, owing to the action of the interference rib 4r, a relatively small amount of the conditioned air is efficiently blown to the occupant 96.

Embodiment 3

A proximity air-conditioning unit for vehicles according to Embodiment 3 is substantially the same as the proximity air-conditioning unit for vehicles according to Embodiment 2, except for having two temperature adjustment units and changing the shapes of the first duct and the second duct so as to correspond to the two temperature adjustment units.

Figure 7:
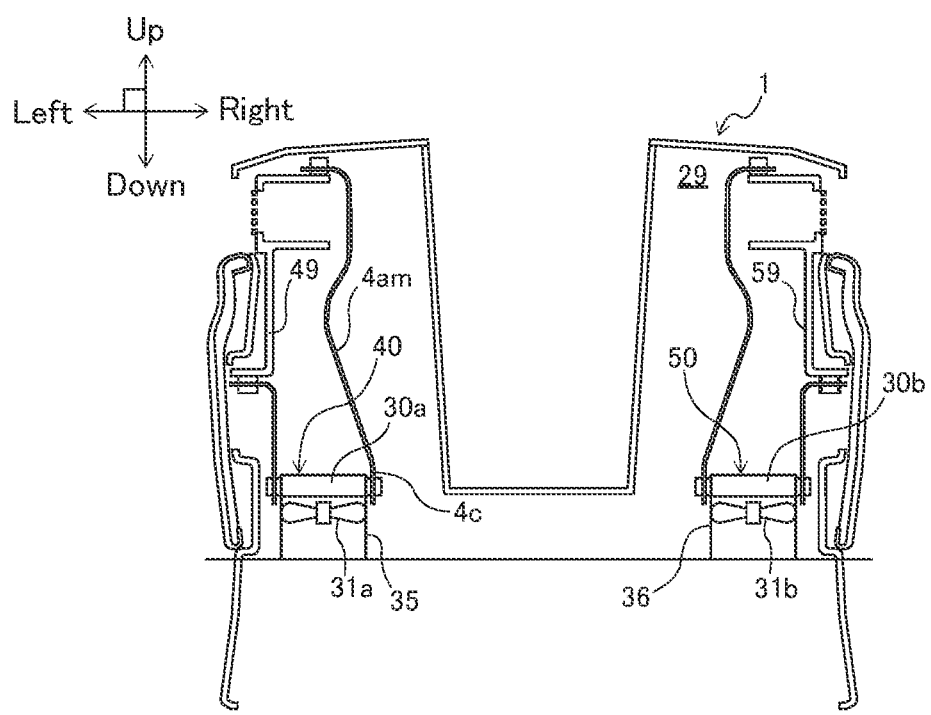
FIG. 7 schematically illustrates a proximity air-conditioning unit for vehicles according to Embodiment 3.

FIG. 7 schematically illustrates the proximity air-conditioning unit for vehicles according to Embodiment 3. FIG. 7 illustrates a cross-section of the proximity air-conditioning unit for vehicles according to Embodiment 3 as viewed from the rear side.

As shown in FIG. 7, the proximity air-conditioning unit 1 for vehicles according to Embodiment 3 has two temperature adjustment units 35 and 36. One of the two temperature adjustment units 35 and 36 is referred to as a first temperature adjustment unit 35, and the other of the two temperature adjustment units 35 and 36 is referred to as a second temperature adjustment unit 36. The first temperature adjustment unit 35 has a first temperature adjuster 30a and a first blower 31a, and the second temperature adjustment unit 36 has a second temperature adjuster 30b and a second blower 31b. The first temperature adjuster 30a and the second temperature adjuster 30b are substantially the same as the temperature adjuster 30 in the proximity air-conditioning unit 1 for vehicles according to Embodiment 1, except that the first temperature adjuster 30a and the second temperature adjuster 30b are small in size. In addition, the first blower 31a and the second blower 31b are substantially the same as the blower 31 in the proximity air-conditioning unit 1 for vehicles according to Embodiment 1, except that the first blower 31a and the second blower 31b are small in size.

Inside the housing 2, the first temperature adjustment unit 35 is disposed on the passenger seat 92 side, and the second temperature adjustment unit 36 is disposed on the driver seat 91 side.

The first duct 4 includes a first cover portion 4c located on the first introduction port 40 side and covering an upper portion of the first temperature adjustment unit 35 from the outside, and a first duct body 4am continuous with the first cover portion 4c. An end portion on the first cover portion 4c side of the first duct body 4am is considered substantially as the first introduction port 40 of the first duct 4. Therefore, in the proximity air-conditioning unit 1 for vehicles according to Embodiment 3 as well, the first introduction port 40 is disposed on the downstream side of the air flow with respect to the first temperature adjustment unit 35, and the conditioned air is considered to be introduced into the first introduction port 40.

Similarly, the second introduction port 50 of the second duct 5 is disposed on the downstream side of the air flow with respect to the second temperature adjustment unit 36. The first duct 4 and the second duct 5 each have a substantially I tubular shape extending vertically.

The first temperature adjustment unit 35 and the second temperature adjustment unit 36 are separated from each other in the right-left direction. Therefore, the first duct 4 and the second duct 5 are also separated from each other in the right-left direction. The first duct 4 and the second duct 5 have side wall adjacent portions 49 and 59 similar to those of the first duct 4 and the second duct 5 in the proximity air-conditioning unit 1 for vehicles according to Embodiment 2. Therefore, with the proximity air-conditioning unit 1 for vehicles according to Embodiment 3 as well, similar to the proximity air-conditioning unit 1 for vehicles according to Embodiment 2, not only air-conditioning is performed by the conditioned air itself, but also air-conditioning is performed in the vicinity of the passenger seat 92 by the exhaust heat of the first duct 4 and air-conditioning is performed in the vicinity of the driver seat 91 by the exhaust heat of the second duct 5.

Since the proximity air-conditioning unit 1 for vehicles according to Embodiment 3 has the two temperature adjustment units 35 and 36, there is an advantage that air-conditioning on the driver seat 91 side and air-conditioning on the passenger seat 92 side are performed independently.

Moreover, in the proximity air-conditioning unit 1 for vehicles according to Embodiment 3, since the first duct 4 and the second duct 5 are separately disposed, the space for the proximity air-conditioning unit 1 for vehicles is saved, so that there is also an advantage that the internal space 29 of the housing 2 is used effectively.

The present invention is not limited to the embodiments described above and shown in the drawings, but may be modified as appropriate without deviating from the gist of the present invention. Furthermore, components described in the present specification including the embodiments may be optionally extracted and combined to be implemented.

DESCRIPTION OF REFERENCE CHARACTERS 1 proximity air-conditioning unit for vehicles
2 housing
3 temperature adjustment unit
4 duct (first duct)
5 duct (second duct)
6 drink holder
21 side wall on seat side of housing (left side wall)
22 side wall on seat side of housing (right side wall)
29 internal space of housing
30 temperature adjuster
30a temperature adjuster (first temperature adjuster)
30b temperature adjuster (second temperature adjuster)
31 blower
31a blower (first blower)
31b blower (second blower)
35 temperature adjustment unit (first temperature adjustment unit)
36 temperature adjustment unit (second temperature adjustment unit)
40 introduction port (first introduction port)
41 blowout port (first blowout port)
42 flow path portion (first flow path portion)
48 holder adjacent portion (first holder adjacent portion)
49 wall side adjacent portion (first side wall adjacent portion)
50 introduction port (second introduction port)
51 blowout port (second blowout port)
52 flow path portion (second flow path portion)
58 holder adjacent portion (second holder adjacent portion)
59 wall side adjacent portion (second side wall adjacent portion)
91 seat (second seat, driver seat)
92 seat (first seat, passenger seat)
93 seat surface
96 occupant
96t thigh

The invention claimed is:

1. A proximity air-conditioning unit for vehicles, comprising:
    a housing disposed on a lateral side of a seat of a vehicle;
    a temperature adjustment unit including a temperature adjuster and a blower and disposed inside the housing; and
    a duct disposed inside the housing and having an introduction port into which air having passed through the temperature adjustment unit is introduced, a blowout port exposed on a surface of the housing and facing the seat, and a flow path portion providing communication between the introduction port and the blowout port, wherein
    the duct has a side wall adjacent portion extending vertically along a side wall on the seat side of the housing,
    an upper end of the blowout port is located above a seat surface of the seat,
    one end portion in a long-side direction of the blowout port is located on a front side with respect to another end portion thereof in a front-back direction of the seat, and
    the temperature adjustment unit is disposed between both end portions in the long-side direction of the blowout port.

2. The proximity air-conditioning unit for vehicles according to claim 1, wherein the introduction port has a flow path cross-sectional area smaller than that of the blowout port.

3. The proximity air-conditioning unit for vehicles according to claim 1, wherein
    the housing has a drink holder having a case shape, and the duct has a holder adjacent portion adjacent to the outside of the drink holder.

4. The proximity air-conditioning unit for vehicles according to claim 1, wherein the housing is disposed between a first seat being the seat and a second seat, the temperature adjustment unit being a first temperature adjustment unit having a first temperature adjuster being the temperature adjuster and a first blower being the blower, and further comprising a second temperature adjustment unit having a second temperature adjuster and a second blower, and the duct being a first duct having a first introduction port being the introduction port into which air having passed through the first temperature adjustment unit is introduced, a first blowout port being the port exposed on the surface of the housing and facing the first seat, and a first flow path portion being the flow path portion providing communication between the first introduction port and the first blowout port, and further comprising a second duct having a second introduction port into which air having passed through the second temperature adjustment unit is introduced, a second blowout port exposed on the surface of the housing and facing the second seat, and a second flow path portion providing communication between the second introduction port and the second blowout port.

\* \* \* \* \*